Figure 1:
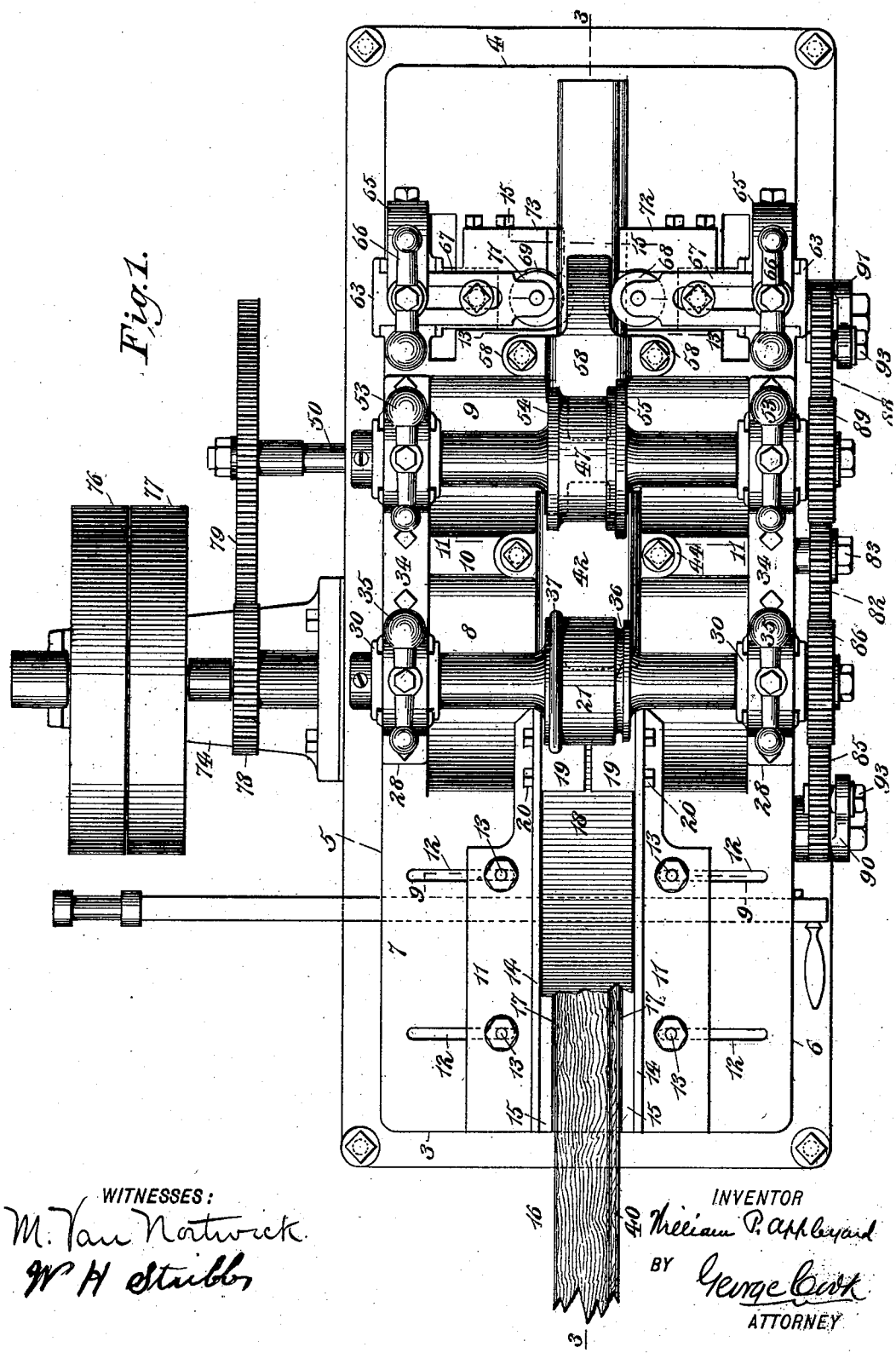

No. 700,468.

W. P. APPLEYARD.

MACHINE FOR COVERING STRIPS OF TIMBER WITH METAL.

(Application filed Dec. 26, 1901.)

(No Model.)

Patented May 20, 1902.

5 Sheets—Sheet 1.

WITNESSES:
M. Van Nortwick.
W. H. Stubbs.

INVENTOR
William P. Appleyard
BY George Cook
ATTORNEY

No. 700,468. Patented May 20, 1902.
W. P. APPLEYARD.
MACHINE FOR COVERING STRIPS OF TIMBER WITH METAL.
(Application filed Dec. 26, 1901.)
(No Model.) 5 Sheets—Sheet 2.
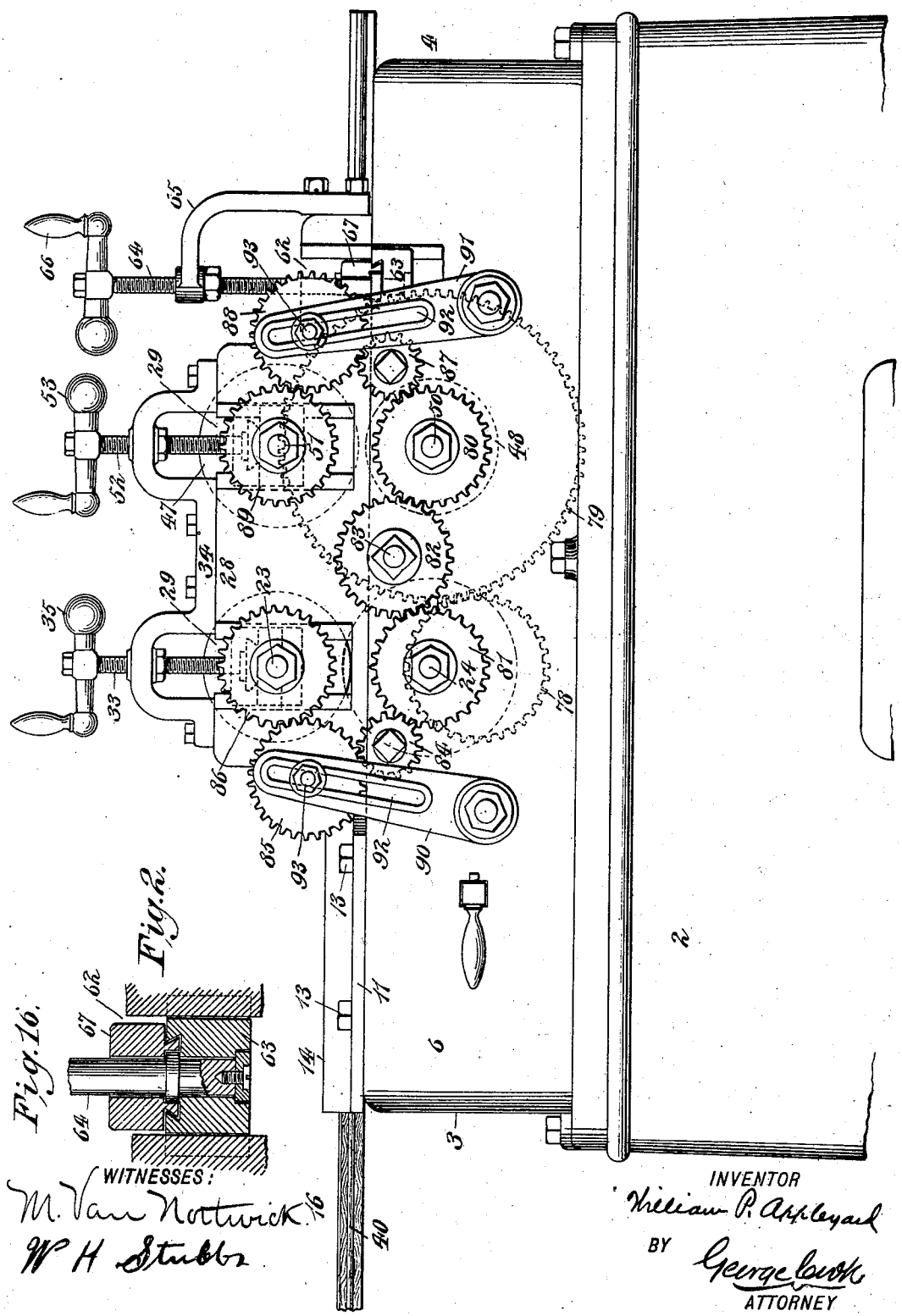
WITNESSES:
M. Van Nottwick
W. H. Stubbs
INVENTOR
William P. Appleyard
BY George Cook
ATTORNEY

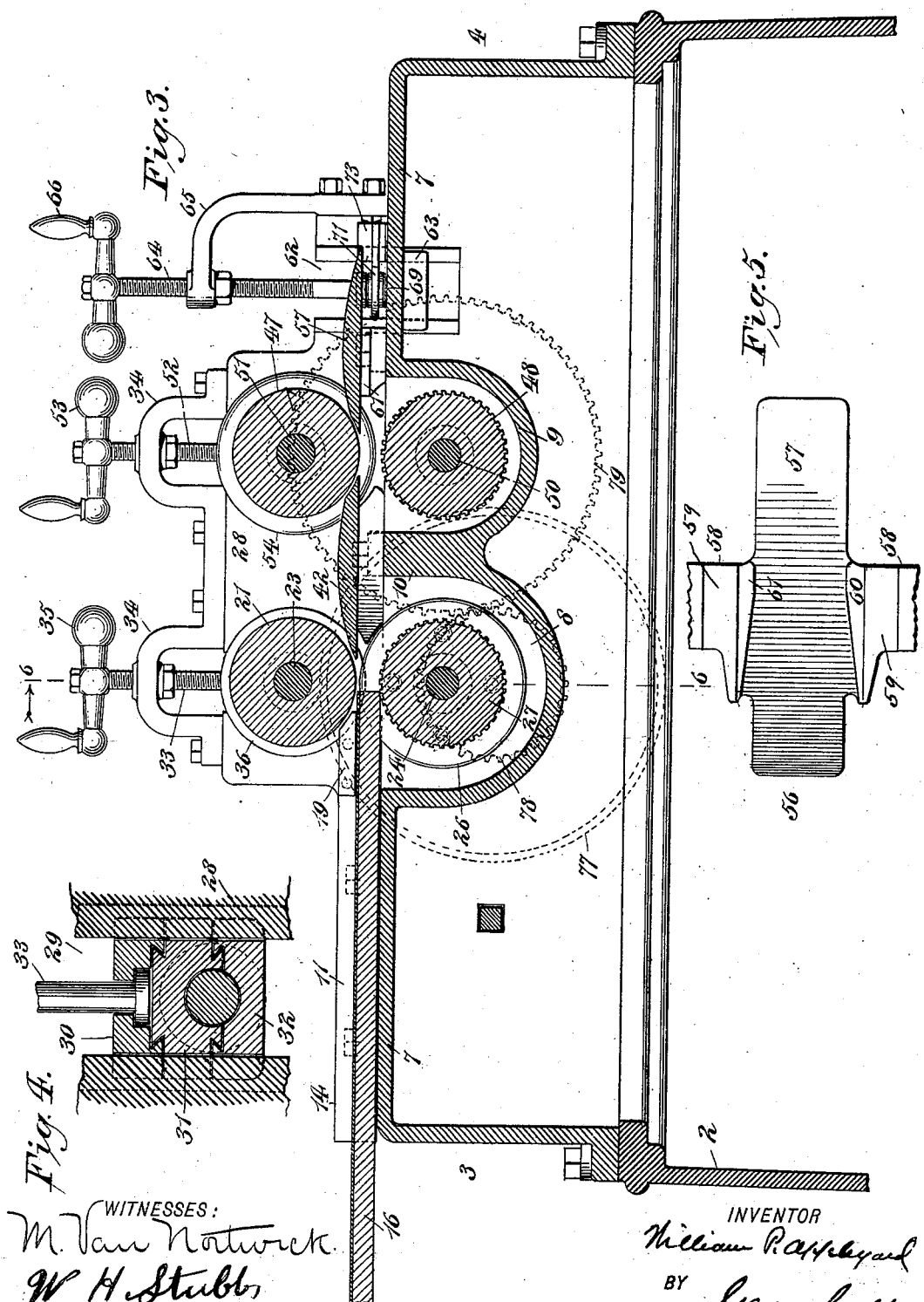

No. 700,468. Patented May 20, 1902.
W. P. APPLEYARD.
MACHINE FOR COVERING STRIPS OF TIMBER WITH METAL.
(Application filed Dec. 26, 1901.)
(No Model.) 5 Sheets—Sheet 4.
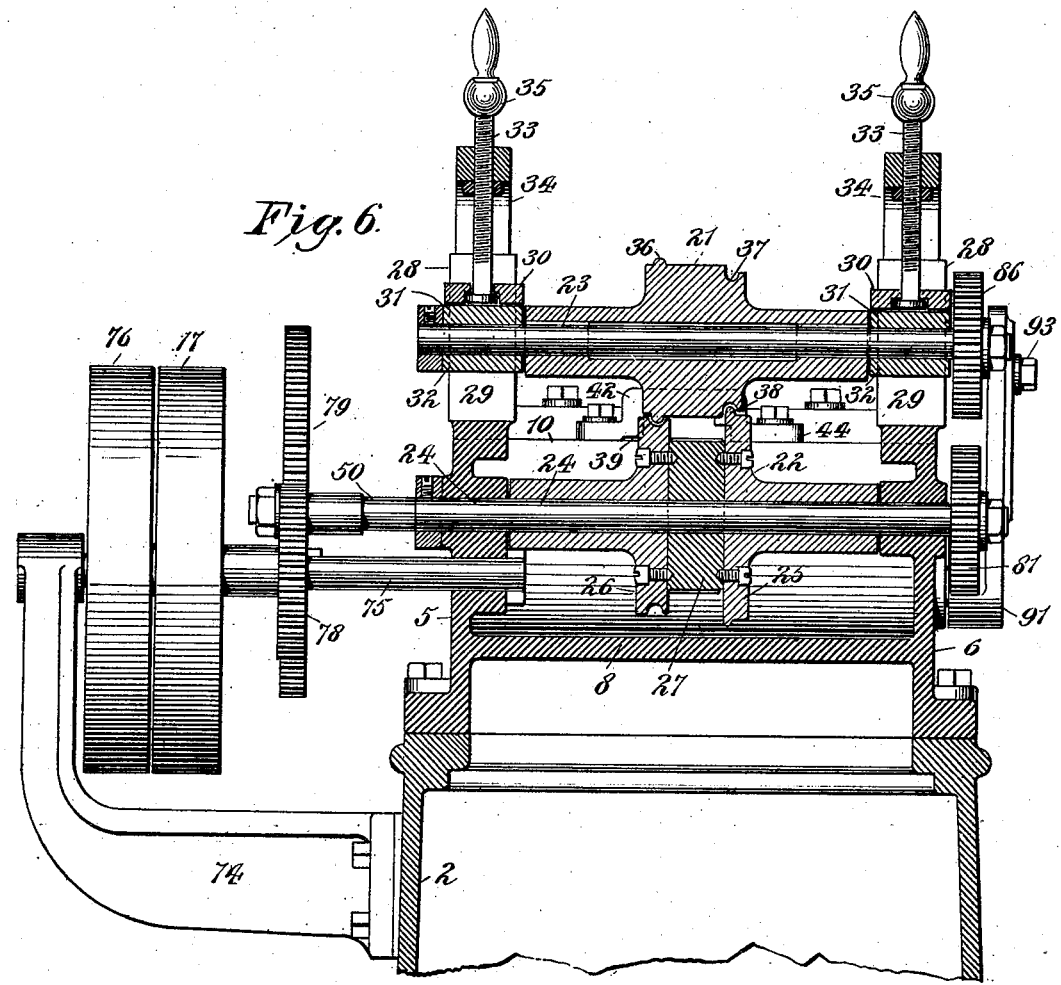
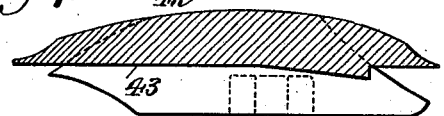
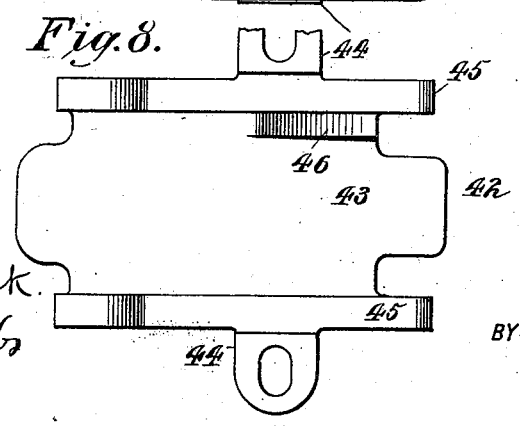
WITNESSES:
M. Van Notwick
W. H. Stubbs
INVENTOR
William P. Appleyard
BY George Cook
ATTORNEY
THE NORRIS PETERS CO., PHOTO-LITHO., WASHINGTON, D. C.

No. 700,468. Patented May 20, 1902.
W. P. APPLEYARD.
MACHINE FOR COVERING STRIPS OF TIMBER WITH METAL.
(Application filed Dec. 26, 1901.)
(No Model.) 5 Sheets—Sheet 5.
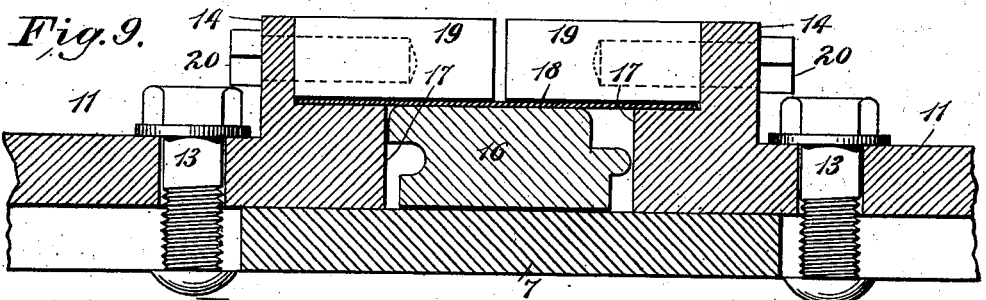
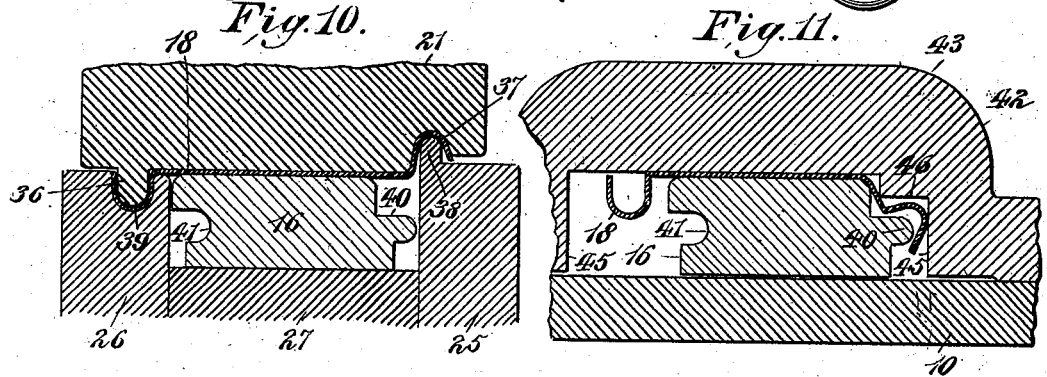
WITNESSES:
M. Van Nortwick.
W. H. Stubbs.
INVENTOR
William P. Appleyard
BY George Cook.
ATTORNEY

UNITED STATES PATENT OFFICE.

WILLIAM P. APPLEYARD, OF NEW HAVEN, CONNECTICUT, ASSIGNOR TO METAL PLATED CAR AND LUMBER COMPANY, A CORPORATION OF NEW JERSEY.

MACHINE FOR COVERING STRIPS OF TIMBER WITH METAL.

SPECIFICATION forming part of Letters Patent No. 700,468, dated May 20, 1902.

Application filed December 26, 1901. Serial No. 87,248. (No model.)

*To all whom it may concern:*

Be it known that I, WILLIAM P. APPLEYARD, a citizen of the United States, and a resident of New Haven, in the county of New Haven and State of Connecticut, have made and invented certain new and useful Improvements in Machines for Covering Strips of Timber with Metal, of which the following is a specification.

My invention relates to an improvement in machines for covering strips of wood with metal, and more particularly upon the machine as shown and described in Letters Patent granted to me May 23, 1899, and numbered 625,531. By reference to the said patent it will be seen that the machine as heretofore constructed consists of a feed-roll, a superposed primary roll adapted to turn the edges of the metal downwardly as the strips of metal and wood pass below the same, and two horizontal rolls for properly shaping the edges of the metal and simultaneously bending or turning it around the tongue and into the groove formed on the opposite edges of the wooden strip, a finishing-roll being employed in conjunction with the horizontal rolls to hold the metal down upon the upper surface of the wooden strip during the operation of shaping, bending, and locking the edges. From several years' experience with this class of machines I have found that instead of shaping, bending, and locking the edges of the downwardly-turned metal strip at one operation and by one set of rolls it is far better to first approximately shape the edges of the flat metal to conform to the particular shape or contour of the edges of the wooden strip and then by a series of operations to gradually complete the shaping, bending, and locking of the edges of said metal strip, these successive steps being effected by several pairs of rollers and stationary devices, in that in the finished product the metal fits tighter and closer to the wooden strip and is more firmly and securely locked thereto. To carry out this method, I have devised a machine consisting of certain novel features of construction and combinations of parts, as will be hereinafter fully described, and pointed out in the claims.

In the accompanying drawings, Figure 1 is a plan view of my improved machine. Fig. 2 is a view in side elevation. Fig. 3 is a longitudinal sectional view taken on the line 3 3 of Fig. 1. Fig. 4 is a detail sectional view showing the horizontal adjustment of the bearing-boxes. Fig. 5 is a bottom plan view of the rear guide-shoe. Fig. 6 is a sectional view taken on the line 6 6 of Fig. 3. Fig. 7 is a sectional view of the forward guide-shoe located between the rollers. Fig. 8 is a bottom plan view of the forward guide-shoe. Figs. 9, 10, 11, 12, 13, 14, and 15 are sectional views showing the successive steps of bending and locking the sheet metal to the wooden strip, Fig. 9 being taken on the line 9 9 of Fig. 1, Fig. 11 being taken on the line 11 11 of Fig. 1, Fig. 13 on the line 13 13 of Fig. 1, and Fig. 15 on the line 15 15 of Fig. 1. Fig. 16 is a sectional view of one of the adjusting devices for the horizontal rolls.

Referring to the drawings, 2 represents a stand or support, preferably formed of metal and of any desired shape, to which is bolted or otherwise secured the frame, preferably made in box-like form—that is, with front and rear plates 3 4, side plates 5 6, and with the top plate 7, the latter being curved downwardly at about the center of its length to form the two transverse receptacles 8 9, separated by the transverse web or flange 10. To the forward end of the plate 7 are bolted the guide-plates 11, preferably of the form as illustrated in Figs. 1 and 9, elongated slots 12 being formed in the said plate 7, through which the fastening-bolts 13 pass, whereby said guide-plates 11 may be horizontally adjusted toward or away from each other to accommodate strips of timber of different widths. These guide-plates are constructed with the vertical flanges 14 and shoulders or ledges 15, whereby in practice the strip of timber 16 under operation will rest upon the base-plate 7 and between the adjacent edges 17 of the guides, the strip of copper or sheet metal 18 being supported on said timber and on the ledges 15 between the flanges 14. In order so assist the guides 11 in retaining the timber 16 and sheet metal 18 in their proper relative positions during the travel of the same toward the first pair of rollers or formers, I secure to the guides 11 the plates 19, the lower surfaces of which bear on the upper surface of the metal strip, said plates 19 being retained in place by means of the bolts or screws 20, threaded therein and passing through the flanges 14 of the guides 11.

In the forward part of the machine is mounted the pair of rollers 21 22, which I term the "sheath-formers," the roller 21 being mounted on the shaft 23 and the roll 22 on the shaft 24, these rollers, as hereinafter described, being employed for bending the edges of the metal 18 into approximately the shape of the edges of the strip of timber 16, as clearly illustrated in Fig. 10. The lower roller or sheath-former 22, located in the receptacle 8 of the frame, is preferably made of three parts—namely, the two dies 25 26 and the intermediate roller 27—said dies being bolted or otherwise secured to said roller 27, as illustrated in Fig. 6, and mounted on the shaft 24, the latter being supported in suitable bearings formed in the sides 5 6 of the frame. The upper sheath-former 21 is shown as made in one piece, its shaft 23 being supported in bearings adjustably secured in the sides 5 6 of the frame, which sides are extended upwardly, as illustrated at 28. These extensions of the sides of the frame are cut out, as illustrated at 29, to receive the bearings for the shaft 23, which bearings, as illustrated in Fig. 4, are preferably made in three pieces or sections—namely, the upper section 30, middle section 31, and lower section 32, the said upper and lower sections being dovetailed into the middle section in order that they may be simultaneously raised or lowered with each other and with the contained shaft 23. Into the upper sections 30 of the bearings are secured the lower ends of the rods 33, the upper portions of which are threaded in openings formed in the yokes 34, the latter being bolted or otherwise secured to the upper edges of the extended sides 28 of the frame, the extreme upper ends of said rods 33 having secured thereto or formed thereon the handles 35, whereby said rods may be raised or lowered and the bearings for the upper roller 21 correspondingly vertically adjusted, this construction and arrangement of parts allowing the upper roller 21 to be adjusted toward or away from the lower roller 22 in accordance with the thickness of timber and metal, and also permitting both rollers to be removed or detached from their respective shafts and others substituted.

As illustrated in Figs. 6 and 10, the upper roller or former 21 is provided on its surface and near one edge thereof with the bead 36 and near its opposite edge with the groove 37, the lower roller or former having its die 25 provided with the flange 38 and its die 26 with the groove 39, these several parts so operating with relation to each other that the strip of metal 18 has its edges bent to approximately conform to the shape of the tongue 40 and groove 41, formed on and in the edges of the strip of timber 16, the central portion of the metal strip being retained in its flattened condition and against the timber by reason of the central portion of the roller 21 bearing or pressing on the same.

Back of the forming-roller 21 and secured to the upper side or edge of the web or flange 10 is located the forward guide-shoe 42, which consists of a plate 43, provided with the ears or lugs 44, whereby it is secured in place, and with downwardly-extending flanges 45, between which latter the strips of timber and metal pass as they are fed from the rollers 21 22 to the rear rollers, hereinafter referred to. The under side of the plate 43 is provided at one side thereof with the downwardly-projecting strip 46, extending from about the center of the length of said plate to the rear end thereof, the under side or surface of said strip 46 being inclined—that is, starting at about the center of the length of said plate 43 the same increases in thickness toward its rear end, the purpose and effect of this projection being to gradually bend downwardly that edge of the metal shaped to fit around the tongue 40 of the timber as the latter and the metal strip pass under the shoe and between the flanges thereof, as illustrated in Fig. 11. Behind this guide-shoe 42 is located a second pair of rollers, consisting of the upper roller 47 and the lower roller 48, the latter being contained within the receptacle 9, formed in the top of the frame and mounted upon the shaft 50, the ends of which shaft are supported in suitable bearings provided in the sides of the frame, and the former or top roll 47, which I term the "rear sheath-former," being mounted upon the shaft 51, this shaft being supported in bearings located in the side extensions 28. These bearings are in all respects similarly constructed and arranged as the bearings supporting the shafts of the forward rollers illustrated in Fig. 4, and, as in the former instance, are raised and lowered by means of vertical rods 52, threaded in the yoke-piece 34 and provided on their upper ends with the handles 53.

The lower roller 48, which I term the "rear sheath-carrier," has its surface provided with teeth or corrugations similar to the central portion 27 of the roller 22 for the purpose of biting into the under side of the strip of timber and feeding the same through the machine, the upper roller or rear sheath-former 47 having the shape or contour as shown in section in Fig. 12—that is, with the downwardly-projecting flanges 54 55—the object of which is to continue the downward bending of that edge of the metal shaped to fit around the tongue 40 of the timber, and also to bend downwardly at approximately right angles the opposite edge of the metal shaped to fit into the groove 41.

Back of the rollers 47 48 is located the rear guide-shoe 56, a bottom plan view of which is shown in Fig. 5. This shoe consists of the plate 57, provided with the lateral arms 58, through which the shoe is bolted or otherwise secured to the plate 7 of the frame. The shoe is provided on its under surface with the guides 59, between which the strip of timber and its partially-shaped metal strip pass, and also with the shoulders 60 61, which latter bears upon that edge of the metal shaped to fit around the tongue and forces it into proper place upon the upper surface of said tongue, and the former upon the opposite-shaped metal edge to partially bend it into place, as clearly illustrated in section in Fig. 13.

In the openings or recesses 62, formed in the upwardly-extended sides 28 of the frame, are located the adjusting-caps 63, (shown in section in Fig. 16,) adapted to be vertically raised and lowered by means of the rods 64, the lower ends of which latter are secured to said caps and the upper portions of which are threaded into the brackets 65, the extreme upper ends of said rods being provided with handles 66 to facilitate turning the same. To the bearing-caps 63 are secured the bearing-plates 67, adjustable horizontally and carrying at their inner free ends the horizontal rollers 68 69, the former being provided with a groove 70, adapted to lock the metal tightly around the tongue 40 of the wooden strip, and the latter—that is, the roller 69—being provided with the flange or bead 71 to carry the opposite edge of the metal strip into the groove 41 of said wooden strip, as illustrated in section in Fig. 14. By means of this construction and arrangement of parts it will be understood that the edges of the metal strip are first shaped to approximate that of the edges of the timber and are then gradually bent downwardly into their proper position, the horizontal rollers locking them in place. As there is some tendency, however, of the metal to leave the wood as the covered strip issues from between the horizontal rolls 68 69, I have secured immediately behind the latter the guide-formers 72 73, their inner ends being shaped as shown in section in Fig. 15—that is, shaped to receive the tongue-and-grooved edges of the metal-covered strip, the effect being to assist in locking the metal in place and prevent the separation of the wooden and metal strips as the finished material issues from the machine.

While I have shown and described my improved machine as provided with rolls or formers adapted to cover a strip of timber provided on its edges with a tongue and groove, I do not intend to limit my invention thereto, as by means of rollers of different sizes and shapes, which may be readily substituted for those hereinbefore referred to, I am enabled to cover wooden strips having different shapes or outlines, the machine being so constructed that the rollers and formers may be readily removed and others substituted therefor.

In order to impart the necessary rotation to the several rollers, I secure to the stand or support a bracket 74, in which is journaled one end of the shaft 75, the opposite end being supported in the bearings formed in the side 5 of the frame. Upon this shaft are mounted the tight and loose pulleys 76 77, by means of which motion is imparted to said shaft and to the gear 78, the latter meshing with the gear 79, secured to one end of the shaft 50. The opposite end of the shaft 50 has secured thereto the gear 80, which imparts its motion to the gear 81, secured to the end of the shaft 24, through the intermediate gear 82, mounted on the stud 83, which latter in turn is secured to the side 6 of the frame. Through the intermediate gears 84 and 85 motion is also transmitted to the gear 86, secured to one end of the shaft 23, and through the intermediate gears 87 and 88 motion is transmitted from the gear 80 to the gear 89, secured to the end of the shaft 51, the said gears 84 and 87 being secured to studs which in turn are secured to the sides 6 of the frame, and the gears 85 and 88 being adjustably secured upon the arms 90 91, which latter have their lower ends movably secured to the sides 6 of the frame, whereby said gears 85 88 may be adjusted toward or away from said former gears. In order to allow said gears 85 88 to be adjusted vertically, the arms 90 91 are provided with elongated slots 92, in which are movably secured the studs 93, carrying said gears.

Having fully described my invention, what I claim as new, and desire to secure by Letters Patent, is—

1. In a machine of the character described, the combination with a suitable frame, of a pair of sheath-formers mounted in the forward part thereof and adapted to approximately shape the edges of the metal, the upper former being constructed in one piece and the lower former consisting of two dies and an intermediate roller, shafts to which said sheath-formers are detachably secured, and means mounted on said frame and adapted to complete the bending and shaping of the edges of said metal, substantially as described.

2. In a machine of the character described, the combination with a suitable frame, of a pair of shafts adjustably mounted in the forward part of said frame and located one above the other, an upper former constructed in one piece and removably secured to the upper shaft, a lower former consisting of two dies and an intermediate roller removably secured to the lower shaft, said formers being constructed and arranged to bend the edges of a metal strip to approximately fit around the tongue and into the groove of a wooden strip, and means secured to said frame whereby the bending and locking of the metal to the wooden strip are completed, substantially as described.

3. In a machine of the character described, the combination with a suitable frame, of a pair of sheath-formers mounted in the forward part of said frame and adjustably located one above the other, the upper of said formers being constructed in one piece and provided on its surface and near one edge thereof with a bead and near its opposite end with a groove, said lower former consisting of two dies and an intermediate roller, one of said dies being provided with a flange and the other with a groove, said formers being constructed and arranged to bend the edges of the metal into approximately the shape of a tongue and groove, and means secured to said frame whereby the bending and shaping of the edges of the metal are completed, substantially as described.

4. In a machine of the character described, the combination with a suitable frame, of a pair of formers mounted in the forward part of said frame and located one above the other, said formers being constructed and arranged to bend the edges of a metal strip into approximately the shape of the tongue and groove of a wooden strip, a pair of rollers mounted in said frame and back of said formers and located one above the other, the upper of said rollers being provided on its ends with downwardly-projecting flanges, and the lower roller having its surface provided with teeth or corrugations, and means secured to said frame whereby the bending and locking of the edges of the metal strip to the wooden strip are completed, substantially as described.

5. In a machine of the character described, the combination with a suitable frame, of a pair of shafts adjustably mounted in the forward part of said frame and located one above the other, rollers removably secured to said shafts, a stationary guide-shoe secured to said frame and back of said rollers and provided on its edges with downwardly-extending flanges and at one corner with a wedge-shaped strip, a pair of shafts adjustably mounted in said frame in the rear of said guide-shoe and located one above the other, rollers secured to said last-mentioned shafts, and means secured to said frame whereby the bending and locking of the edges of the metal strip are completed after passing between said rollers and under said guide-shoe, substantially as described.

6. In a machine of the character described, the combination with a suitable frame, of a pair of sheath-formers located in the forward part of said machine and one above the other, said formers being vertically adjustable toward or away from each other, a pair of rollers located in the rear of said sheath-formers and one above the other, said rollers being vertically adjustable toward or away from each other, a pair of horizontal rollers mounted on the rear end of said frame and horizontally adjustable toward or away from each other, and means secured to said frame and between said rollers whereby the latter are assisted in bending, shaping and locking the edges of the metal strip, substantially as described.

7. In a machine of the character described the combination with a suitable frame, of a pair of rollers mounted in said frame and adapted to partially shape both edges of the metal, a stationary guide-shoe adapted to bend downwardly one of said shaped edges of the metal strip, a second pair of rollers adapted to bend downwardly both edges of said metal, a stationary guide-shoe located in the rear of said last-mentioned rollers and adapted to continue the bending of both of said edges of said metal, a third pair of rollers adapted to partially lock said shaped edges of the metal around the edges of the timber, and stationary guides located in the rear of said machine and adapted to completely lock the edges of said metal around the edges of said timber, substantially as described.

8. In a machine of the character described, the combination with a suitable frame, of several pairs of rollers adjustably mounted in said frame and adapted to partially bend, shape and lock the edges of the metal, a forward guide-shoe secured to the frame and in the rear of the first pair of said rollers, said shoe being provided with a downwardly-extending projection at one edge thereof for bending the corresponding edge of the metal strip, a rear guide-shoe provided with shoulders adapted to bend both edges of said metal, and guide-formers located in the rear of said rollers and adapted to assist in locking the metal to the timber, substantially as described.

Signed at New Haven, in the county of New Haven and State of Connecticut, this 17th day of December, A. D. 1901.

WILLIAM P. APPLEYARD.

Witnesses:
MICHAEL F. FLYNN,
HERMAN W. LANYZETTEL.